March 10, 1970 E. J. MARCINKIEWICZ 3,500,310
TRUE PRESENCE VEHICLE DETECTOR INCLUDING MEANS TO DISTINGUISH
BETWEEN SLOW AMBIENT CHANGES AND CHANGES DUE
TO THE PRESENCE OF A VEHICLE
Filed March 29, 1966
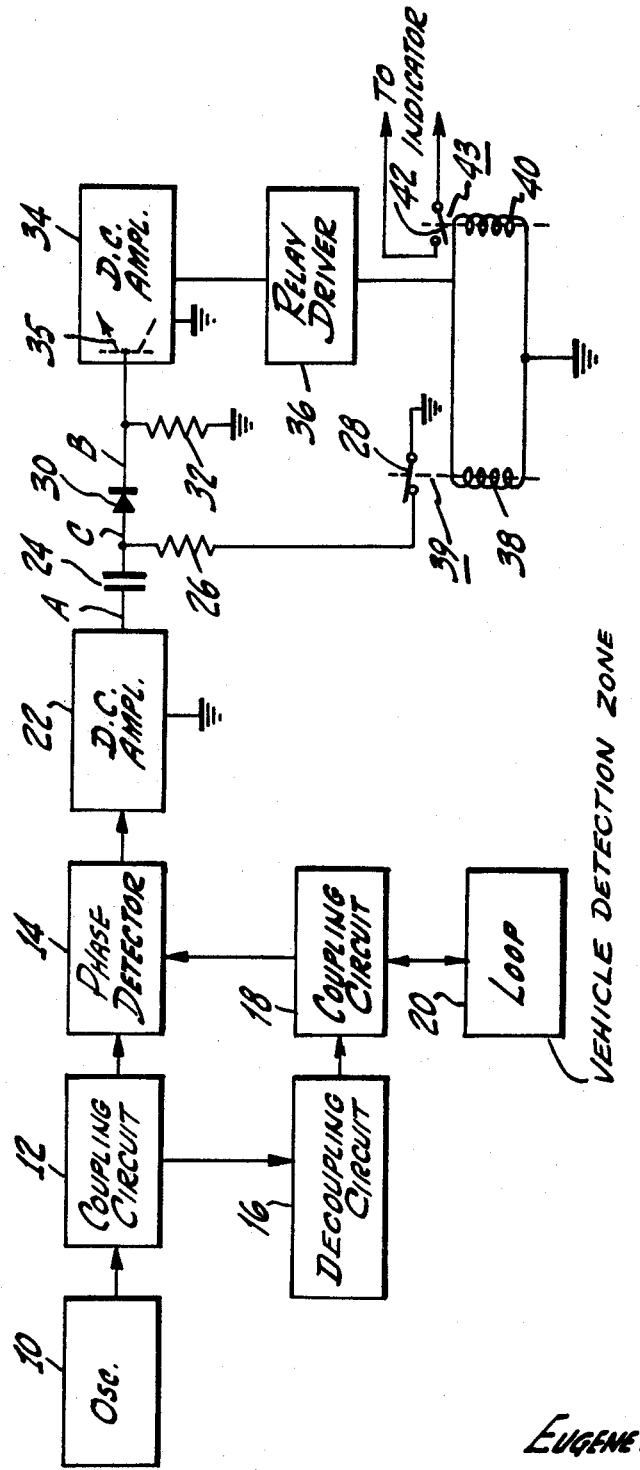
INVENTOR.
EUGENE J. MARCINKIEWICZ
BY
Edward J. Norton
Attorney

United States Patent Office 3,500,310
Patented Mar. 10, 1970

3,500,310
TRUE PRESENCE VEHICLE DETECTOR INCLUDING MEANS TO DISTINGUISH BETWEEN SLOW AMBIENT CHANGES AND CHANGES DUE TO THE PRESENCE OF A VEHICLE
Eugene J. Marcinkiewicz, Northville, Mich., assignor to RCA Corporation, a corporation of Delaware
Filed Mar. 29, 1966, Ser. No. 538,256
Int. Cl. G08g 1/01
U.S. Cl. 340—38      8 Claims

ABSTRACT OF THE DISCLOSURE

A vehicle detector is provided in which a sudden change of voltage, which is due to the presence of a vehicle in a detection zone, is stored in a storage element and the discharge circuit for the storage element is disabled. The discharge circuit for the storage element is enabled in the presence of a slow change of voltage, which may be due to a change of ambient conditions, being applied to the storage element.

---

This invention relates to vehicle detectors and particularly to an improved vehicle detector which avoids disadvantages present in vehicle detectors previously known.

Vehicle detectors are known which include means for preventing slow changes in environmental conditions, such as falling rain, for example, from causing false indication of the presence of a vehicle in the detection zone. In the operation of these detectors, the entry of a vehicle in the detection zone causes an immediate indication of its presence as should be the case. However, if this vehicle remains in the detection zone for any long period of time, say several minutes, the means that prevents false indication of the presence of a vehicle due to slow changes in environmental conditions also causes the indication of the presence of a vehicle to change to the indication of the absence of a vehicle in the detection zone, after several minutes have passed, even though the vehicle has not left the zone. Furthermore, in many prior art devices, if another vehicle enters the zone while the vehicle detector is indicating the presence of a vehicle, and then one of the vehicles leaves the zone, leaving the other vehicle therein, such prior art vehicle detectors indicate that there is no vehicle in the zone. The detector can give a dangerous indication such as indicating the absence of a vehicle, when in fact, a vehicle has been present in the detection zone for several minutes.

It is an object of this invention to provide an improved vehicel detector that will not give a false indication of the presence of a vehicle due to slow environmental changes and yet will give an accurate indication of the presence of a vehicle in a detection zone for a long period of time extending over many hours.

It is another object of this invention to provide an improved vehicle detector including means for preventing false indications of the presence or absence of a vehicle in the detection zone.

It is a further object of this invention to provide an improved vehicle detector that will not give an indication of the absence of a vehicle in the detection zone when a vehicle leaves the zone while another vehicle remains in the zone.

In accordance with this invention, a vehicle detector is provided in which a voltage in a given circuit element of the detector tends to build up due to changes in environmental conditions, for example, weather, and also due to the entry of a vehicle into the detection zone of the detectors. Means are provided for preventing the voltage from building up to a point where a false indication of the presence of a vehicle is provided when the change in voltage is produced by slow changes in environmental conditions. When a vehicle enters the detection zone, a resultant quicker change in voltage causes an indication of the vehicle's presence and also blocks the operation of the means for preventing the voltage build up. As each additional vehicle enters the detection zone, the voltage is further increased. This voltage is decreased in steps as successive vehicles leave the detection zone, whereby the indication of the presence of a vehicle is maintained as long as there is at least one vehicle in the detection zone. Means are also provided for preventing false indications due to the effect of electrical disturbances on the vehicle detector.

The invention is described in greater detail in conjunction with the sole figure of the accompanying drawing which illustrates, partially diagrammatically, one embodiment of this invention.

Referring to the sole figure, an oscillator 10 provides a wave of predetermined frequency such as 100 kilocycles (kc.). This wave is applied to a coupling circuit 12 which applies the wave with no phase shift or with a constant phase shift to one input connection of a phase detector 14, and to a decoupling circuit 16. The decoupling circuit 16 applies the 100 kc. wave to a coupling circuit 18 in a one way manner, whereby feedback is prevented between the coupling circuit 18 and the coupling circuit 12. The coupling circuit 18 supplies the 100 kc. wave to a detection loop 20 which may be several turns of wire surrounding the vehicle detection zone or area of the described vehicle detector. The presence of a vehicle in the loop, that is in the detection zone or area, causes a phase shift of the wave applied to the loop 20. This phase shifted wave is applied to another input connection of the phase detector 14 by way of the coupling circuit 18. The output of the phase detector 14 is zero or a low or nominal negative voltage, for example, when the two waves applied to the phase detector 14 have a phase relationship which indicates no vehicle in the detection zone, a higher negative value when there is a small vehicle in the detection zone, and a still higher negative value when there is a large vehicle or more than one vehicle in the zone.

The output of the phase detector 14 is amplified in a direct current (D.C.) amplifier 22, and the output of the amplifier 22 is applied as a voltage charge or potential on one terminal A of a capacitor 24. A negative voltage is applied from the other terminal C of the capacitor 24 to the anode of a diode 30. The cathode of the diode 30, terminal B, is connected to the base of a NPN transistor 35 comprising part of another D.C. amplifier 34. A leak resistor 26 and contacts 28 of a relay 39 are connected in series between the terminal C and ground. The contacts 28 are normally open, but, as will be explained, they are held closed when no vehicle is present in the detection zone by the coil 38 of the relay 39 which includes the coil 38 and the contacts 28. Another leak resistor 32 is connected between the terminal B and ground or point of reference potential, although as will be explained, this resistor 32 may be omitted if desired. The output of the D.C. amplifier 34 is applied to a relay driver 36. One terminal of each of two relay coils 38 and 40, comprising parts of relays 39 and 43 respectively, are connected to the output of the relay driver 36, the other terminals of the relay coils 38 and 40 being connected to ground, The contacts 42 of the relay 43 are normally closed whereby the contacts 42 are held open when the relay 43 is energized. An indicator (not shown) is connected in a circuit including the contacts 42 whereby the indicator indicates the presence of a vehicle in the detection zone only when the relay 43 is not energized, as will be explained.

The resistor 32 is connected between the base of the NPN transistor 35 (shown in dotted lines), comprising part of the D.C. amplifier 34, and ground. The base current flowing from the base of the transistor 35 divides. Part of the base current flows through the resistor 32 to ground and part of it flows through the diode 30, the resistor 26 and the closed contacts 28 to ground. In the absence of a vehicle in the detection zone, the sum of these two currents is such as to cause the relays 39 and 43 to be energized by means of the amplifier 34 and the relay driver 36, holding the normally open contacts 28 closed and holding the normally closed contacts 42 open. If, however, sufficient base current to keep the relays 39 and 43 energized will flow through the diode 30, the resistor 26 and the contacts 28 when closed, at the voltage applied to the transistor 35, then the resistor 32 may be omitted.

When a vehicle enters the detecting zone comprising the loop 20, this condition is reflected by a change in the output of the phase detector 14 and there is a sudden increase in negative voltage at the terminal C back-biasing the diode 30 and making it non-conductive. Since current can no longer flow from the transistor 35 through the diode 30, the voltage at the point B becomes more negative decreasing the base voltage of the transistor 35, whereby the relays 39 and 43 are de-energized and the normally closed contacts 42 are permitted to close to energize the indicator (not shown) to indicate the presence of a vehicle. The normally open contacts 28 are also permitted to open to break the discharge path for the capacitor 24. The charge on the capacitor 24 cannot leak out through the diode 30 due to the polarity connection thereof, whereby the charge is preserved for a long period of time or until unavoidable leakage paths cause discharge of the capacitor 24. If another vehicle enters the detection zone or loop 20, a corresponding change takes place in the output of the phase detector 14 and the negative voltage at the junction C is further increased in a step-like manner. While this increased voltage will have no effect on the indication, this increased voltage remains at the terminal C until one vehicle leaves the detection zone. When one vehicle leaves the detection zone, the voltage on the terminal C is reduced correspondingly, leaving, however, a voltage at the terminal C corresponding to the presence of a vehicle in the detection zone and consequently the presence of the other vehicle in the detection zone continues to cause blocking of the diode 30 and continues to cause de-energization of the relay coils 38 and 40. Therefore, during a long period of time, while there is at least one vehicle in the detection zone, indication thereof will be made by the indicator (not shown).

When there is no vehicle in the detection zone, and ambient conditions cause a slow phase shift of the wave supplied to the phase detector 14 by the loop 20, the change in voltage at the point A will also be slow. Since a leakage path for the capacitor 24 exists through the resistor 26 and the closed contacts 28 to ground, the voltage of the point C is prevented from rising to the point where the diode 30 is back-biased and therefore blocked. The time constant of the capacitor 24 and the resistor 26, however, is so chosen that the quicker change in voltage at the point A due to the entry of a vehicle into the detection zone is not dissipated by the resistor 26 before the diode 30 is blocked, whereby the contacts 28 is allowed to open and the presence of a vehicle in the detection zone is indicated upon closing of the contacts 42.

As noted above, the resistor 32 may be omitted. However, it is useful in that it tends to prevent a condition called lock-up. This lock-up condition occurs when the described vehicle detector indicates the presence of a vehicle when in fact there is none in the detection zone thereof. This condition may be the result of electrical interference causing the sudden appearance of a positive pulse voltage at the point C. This positive pulse causes increased conduction of the transistor 35. However, when the pulse passes, that is when it reduces to zero in a negative direction, the voltage at the point C becomes more negative than it was before the positive pulse started, causing a false indication. Since such a false indication continues for a long time, the described vehicle detector is said to be locked-up.

The resistor 32 tends to reduce the occurrence of lock-up as follows: The increase in a negative direction of the voltage at the point C, and applied to the base of the transistor 35, must exceed the bias produced by the current flow through the resistor 32 before the diode 30 is blocked to cause an indication of a vehicle in the detection zone. Therefore, the increase of voltage in a negative direction at point C necessary to cause an indication of a vehicle in the detection zone is greater than the decrease of voltage at point C to cancel this indication. The difference in the thresholds of the voltages to cause such indication and to cancel the indication aids in reducing the occurrence of lock-up.

The diode 30 also contributes towards preventing lock-up in that the drop in voltage caused by the diode 30 during the existence of the positive pulse will slow the charge of the capacitor 24, resulting in a lower negative voltage being built up on the capacitor 24, when the position pulse disappears, than if the diode 30 were omitted. Therefore, the diode 30 contributes towards reducing the chances of causing lock-up of the vehicle detector.

The diode 30 has a further function. Usually a silicon transistor is chosen for the transistor 35 since a silicon transistor has a lower leakage current than one of germanium. If the diode 30 were omitted and a high negative potential (of several volts) were applied to the base of the silicon NPN transistor 35 (due to the presence of a vehicle or vehicles in the detection zone), then the diode comprising the base-to-emitter path of the silicon NPN transistor 35 would be made conductive due to the Zener breakdown of its junction rather than non-conductive. The relays 38 and 40 will be de-energized to cause an indication of a vehicle in the detection zone. However, when another vehicle enters the detection zone, the voltage on the base of the transistor 35 will not be increased in a negative direction as greatly as it would have if the base-to-emitter path of the silicon transistor were not conductive. Therefore, when the second vehicle leaves the detection zone (in the absence of a diode 30 and using a silicon NPN transistor 35 in the DC amplifier 34), the voltage reduction at the point C may be great enough so that the described vehicle detector may indicate no vehicle in the detection zone when in fact one remains therein. That is, the diode 30 prevents a high negative voltage at the point C from causing Zener conduction through the base-to-emitter junction of the NPN silicon transistor 35, and therefore prevents wrong indications that result therefrom.

While relays 39 and 43 including energizing coils 38 and 43 and contacts 28 and 42 are illustrated, other switching means may be substituted therefor. Other modifications of the described vehicle detector are possible within the spirit of this invention. The above description is therefore to be considered as illustrative and not in a limiting sense.

What is claimed is:

1. A true presence vehicle detector having a detection zone, comprising:
    means to cause the voltage at a point in the circuit of said vehicle detector to tend to build up responsive to slow condition changes in said detection zone,
    discharge means to prevent building up of said voltage at said point,
    means responsive to fast changes in the condition of said detection zone resulting from an entry of a vehicle into said zone to disable said discharge means, whereby said voltage builds up above a predetermined level only in response to fast changes in the condition of said detection zone, and
    means responsive to the operation of said disabling means to cause an indication of the entry of a vehicle into said zone.

2. A true presence vehicle indicator having a detection zone comprising:
- means to apply a voltage indicating condition changes in said detection zone to a voltage storage device,
- means for discharging said voltage storage device to prevent the voltage of said storage device from building up due to slow condition changes in said detection zone,
- means responsive to fast condition changes in said zone due to the entry of a vehicle into said zone to disable said discharging means allowing the voltage of said storage device to build up due to said fast changes in said detection zone, and
- means responsive to the build up of said voltage due to said fast changes for indicating the occurrence of the entry of a vehicle into said zone.

3. The invention as described in claim 2 in which said storage means is a capacitor,
- said means for discharging comprises a resistor connected between one terminal of said capacitor and a point of reference potential, and
- said means to disable said discharging means comprises a diode connected in series between said terminal of said capacitor and an amplifier, said diode being poled to oppose discharge of said capacitor therethrough.

4. Means to continuously discharge the charge resulting from the application of a slowly varying voltage to a capacitor and to prevent the discharge of the charge on said capacitor resulting from the application of a quickly varying voltage applied thereto, comprising:
- means to apply said slowly varying and said quickly varying voltages to one terminal of said capacitor,
- a discharge path for said capacitor comprising a resistor and a switching means connected in series between the other terminal of said capacitor and a point of reference potential,
- an amplifier,
- a diode connected between said other terminal of said capacitor and said amplifier, said diode being poled to prevent discharge of said capacitor therethrough,
- said amplifier including means to cause current flow through said diode in its low impedance direction, and
- a control means controlled by said amplifier for rendering said switching means nonconductive,
- the charge on said capacitor resulting from said slow varying voltage discharging through said resistor and switching means without rendering said diode non-conductive, the charge on said capacitor resulting from said quickly varying voltage causing back-biasing of said diode to prevent said current flow therethrough and thereby cause said amplifier to operate said control means to render said switching means in said discharge path non-conductive.

5. The invention as described in claim 4 in which said means for applying said slowly varying voltages and said quickly varying voltages to said one terminal of said capacitor comprises apparatus for detecting the presence of a vehicle in a vehicle detection zone thereof.

6. A true presence vehicle detector, comprising:
- an oscillator,
- an impedance which is variable in response to changes in environmental conditions and also in response to the presence of a vehicle in the vicinity thereof,
- a phase detector,
- means to apply a wave provided by said oscillator to said phase detector over two paths, one path including said impedance, whereby a slowly varying voltage appears at an output terminal of said detector due to changes in said environmental conditions and whereby a quickly varying voltage of a first polarity appears at said output terminal of said phase detector due to the presence of a vehicle in the vicinity of said impedance,
- a current source having a terminal,
- a capacitor and a diode connected in the order named between the output terminal of said phase detector and said terminal of said current source, said diode being poled to oppose discharge of said capacitor therethrough,
- a normally conductive discharge path for said capacitor comprising a resistor and a switching means in series,
- the polarity of said current source being such as to tend to cause current flow through said diode in its current conductive direction, said capacitor being responsive only to said quickly varying voltage due to the presence of a vehicle in the vicinity of said impedance to apply a voltage to said diode which causes said diode to be back-biased and change the current flow from said current source, and
- means responsive to the change in said current flow to cause said switching means to become non-conductive and to indicate the presence of a vehicle in the vicinity of said impedance.

7. The invention as expressed in claim 6 in which said current source is a direct current amplifier.

8. The invention as expressed in claim 6 in which said switching means comprises the contacts of a relay and in which the means to cause said switching means to become nonconductive comprises the coil of said relay.

References Cited

UNITED STATES PATENTS

| | | | |
|---|---|---|---|
| 3,286,101 | 11/1966 | Simon | 320—1 |
| 2,620,383 | 12/1952 | Glinski. | |
| 2,983,852 | 5/1961 | Gray. | |
| 3,205,352 | 9/1965 | Prucha. | |
| 3,266,028 | 8/1966 | Taylor. | |
| 2,917,732 | 12/1959 | Chase. | |

THOMAS B. HABECKER, Primary Examiner

U.S. Cl. X.R.

320—1